United States Patent [19]

Dailey

[11] 4,346,920
[45] Aug. 31, 1982

[54] THREADED CONNECTION USING VARIABLE LEAD THREADS

[75] Inventor: Patrick E. Dailey, Torrance, Calif.

[73] Assignee: Smith International, Inc., Newport Beach, Calif.

[21] Appl. No.: 144,347

[22] Filed: Apr. 28, 1980

[51] Int. Cl.³ ............................................. F16L 15/00
[52] U.S. Cl. .................................. 285/89; 29/157 R; 175/297; 285/334; 411/411
[58] Field of Search .................... 285/334, 333, 89; 411/411, 307, 415; 175/297; 29/157 R

[56] References Cited

U.S. PATENT DOCUMENTS

| | | | |
|---|---|---|---|
| 1,254,927 | 1/1918 | Neckerman | 285/89 |
| 1,909,489 | 5/1933 | Eaton | 285/390 X |
| 2,056,112 | 9/1936 | Protin | 285/333 |
| 2,909,380 | 10/1959 | Hoye et al. | 285/333 |
| 3,050,318 | 8/1962 | van der Wissel | 285/334 |
| 3,079,181 | 2/1963 | van der Wissel | 285/333 |
| 3,210,096 | 10/1965 | van der Wissel | 285/115 |
| 4,023,630 | 5/1977 | Perkin et al. | 175/297 |
| 4,067,404 | 1/1978 | Crase | 285/89 X |

FOREIGN PATENT DOCUMENTS 677647 12/1964 Italy ..................................... 285/334

Primary Examiner—Thomas F. Callaghan
Attorney, Agent, or Firm—Christie, Parker & Hale

[57] ABSTRACT

A threaded connection is subject in use after assembly to a load of specified magnitude in a selected direction along the thread axis. As so loaded, the basically constant pitch threads are uniformly stressed. The load faces of the threads on at least one of the members are defined, in the unstressed condition, to have a lead which varies from a constant lead by an amount which, at any given location along the threads, is equal to the amount of net relative deflection of the threaded members along the axis at such location in response to the application to the members of the load of specified magnitude.

The design considerations pertinent to such a connection are set forth in the context of the presently preferred embodiment of the connection.

38 Claims, 13 Drawing Figures

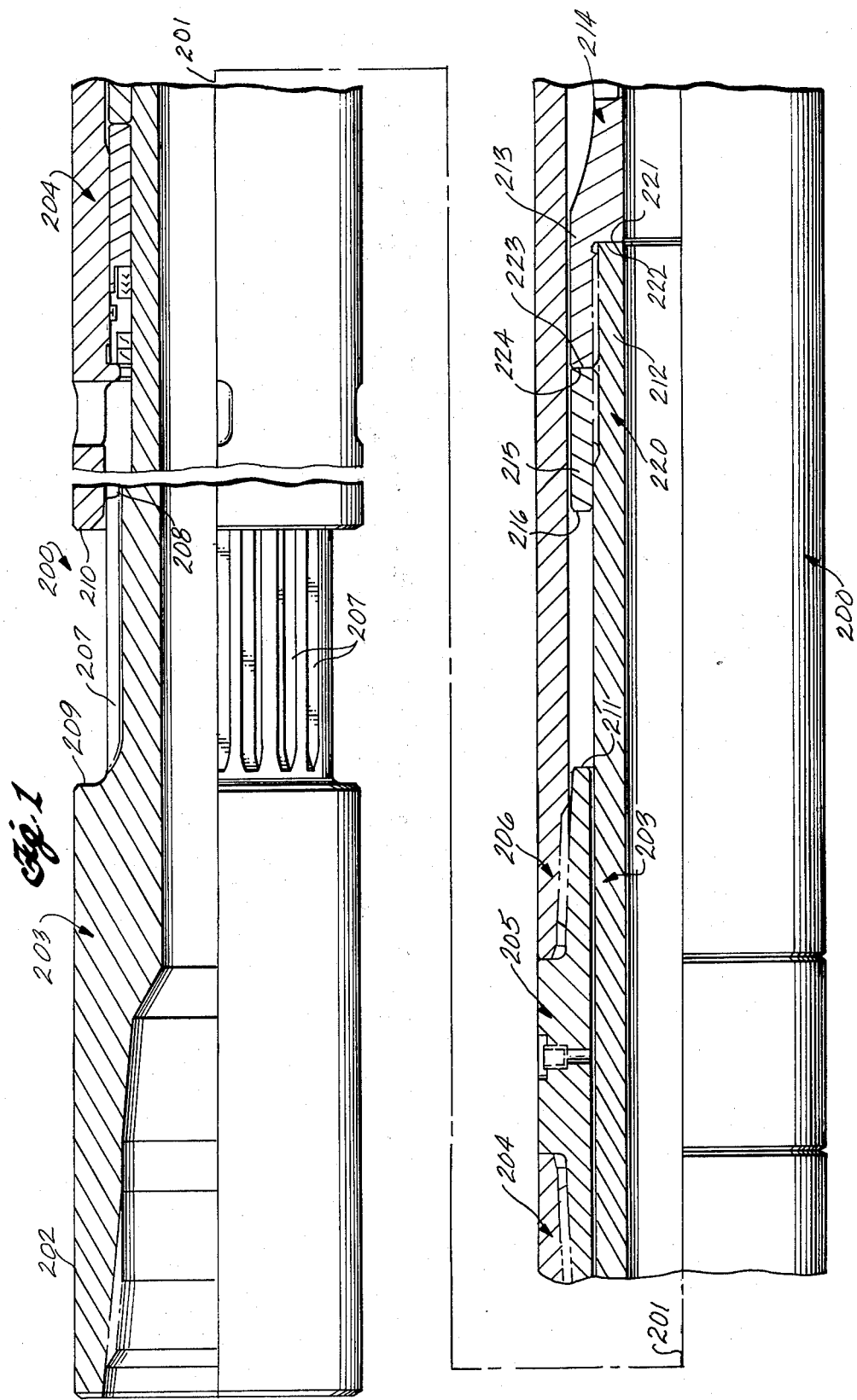

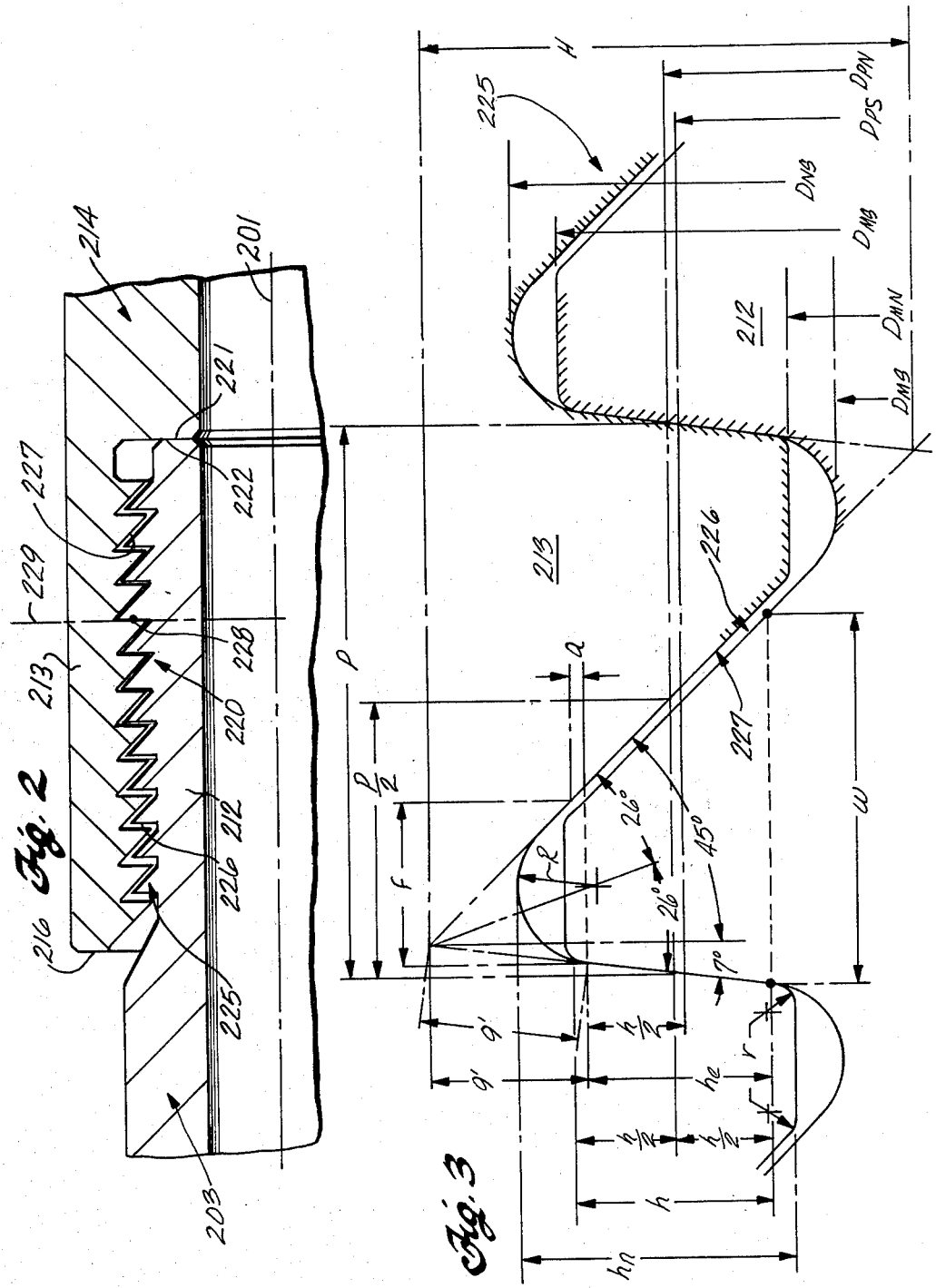

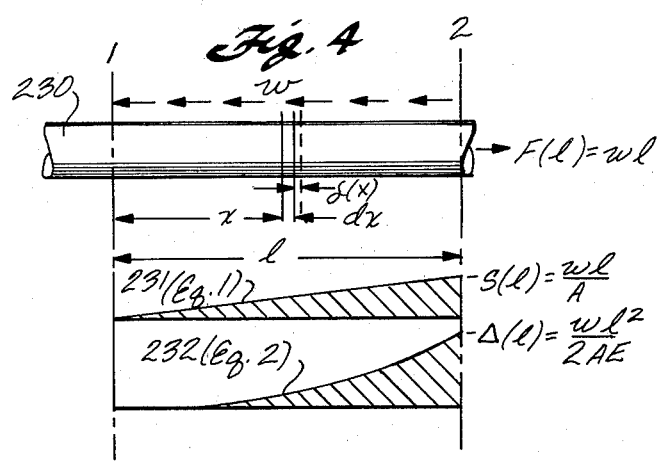
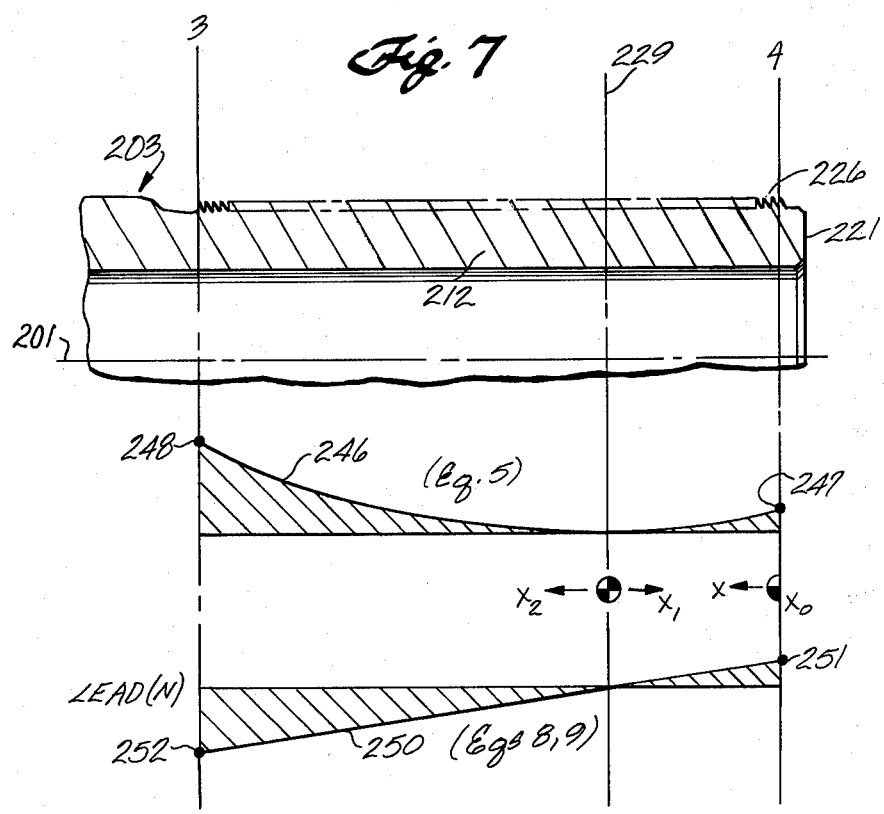

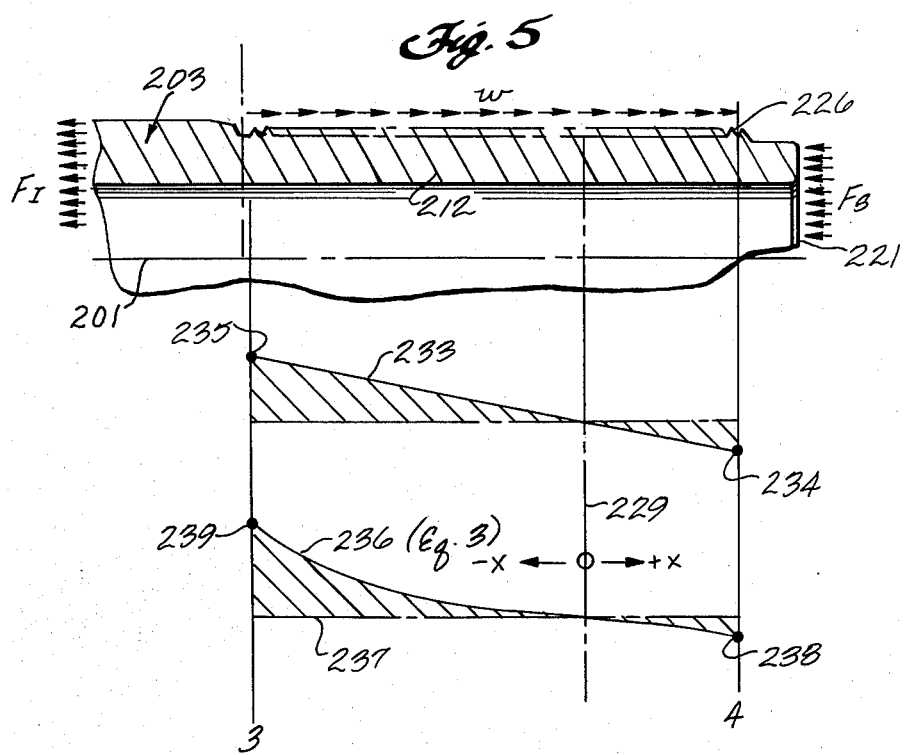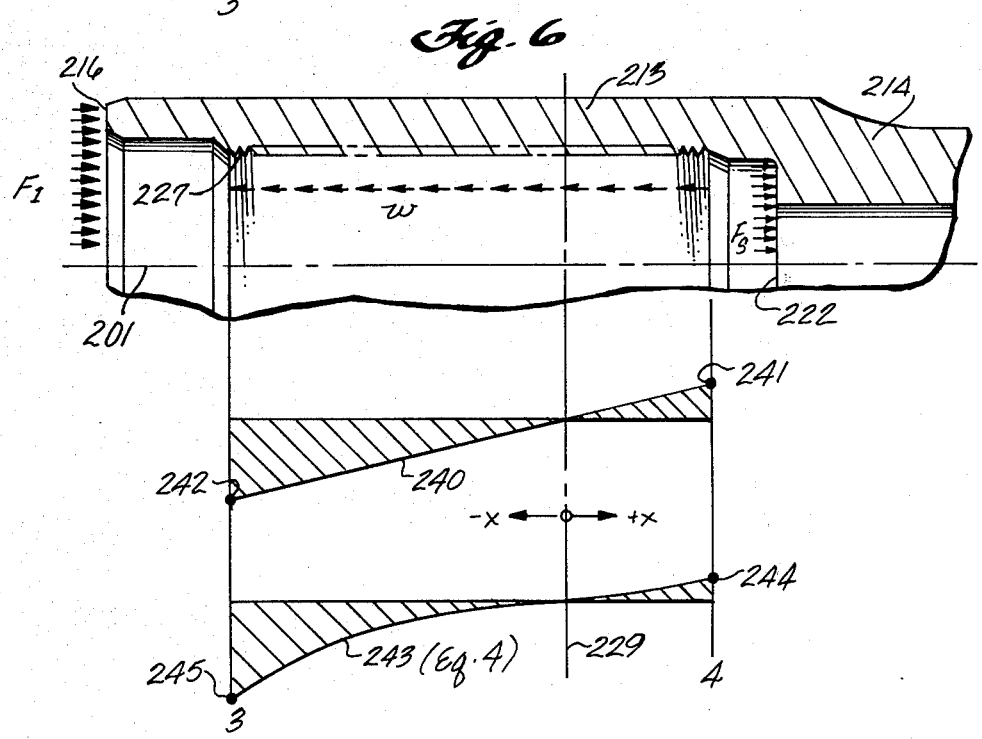

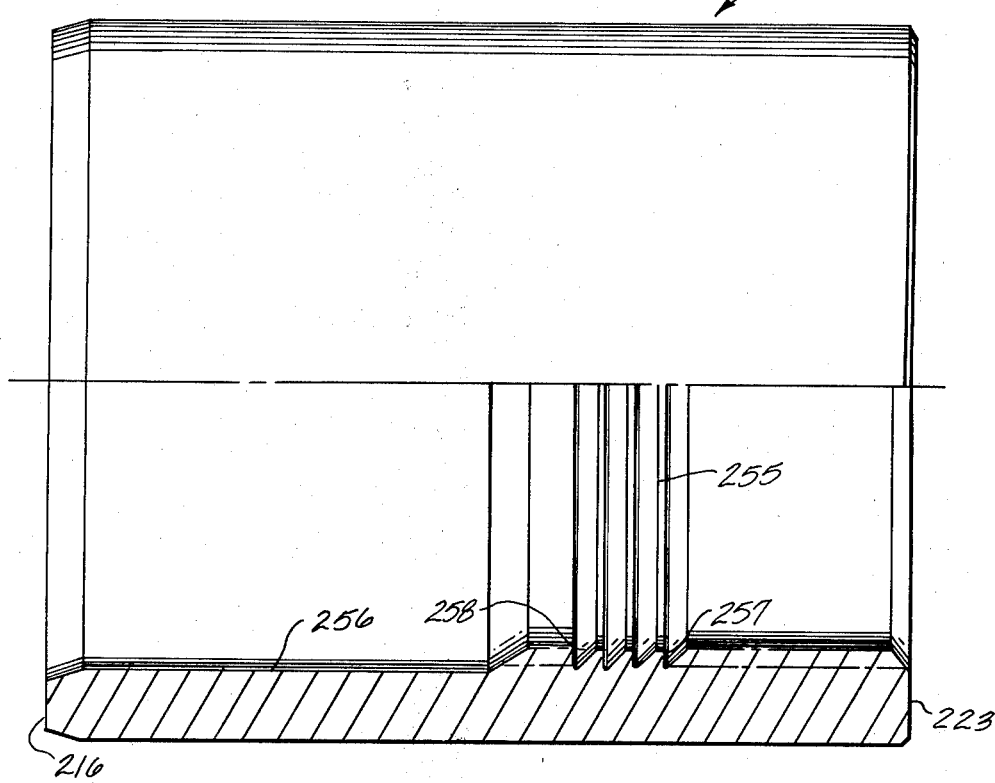

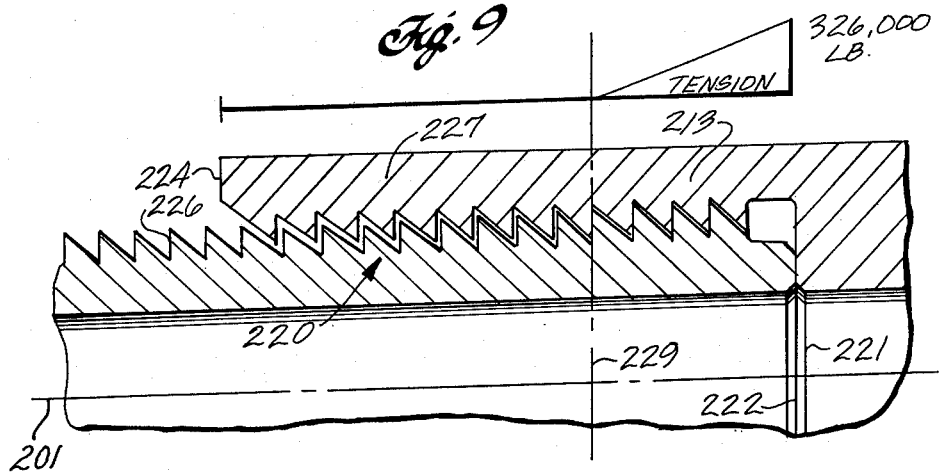
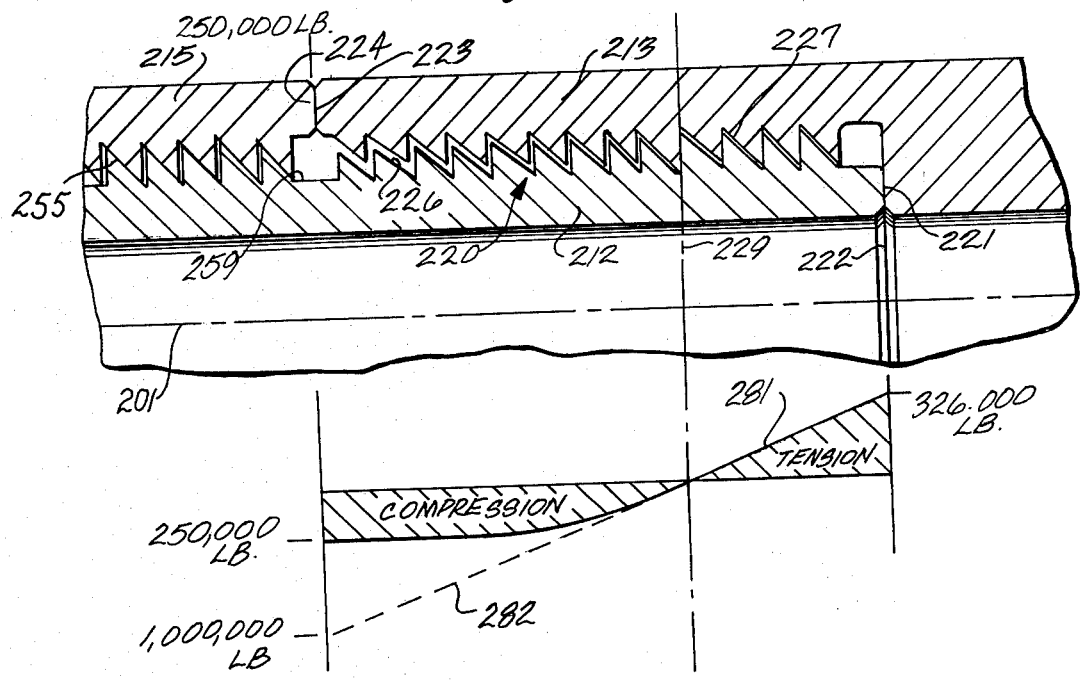

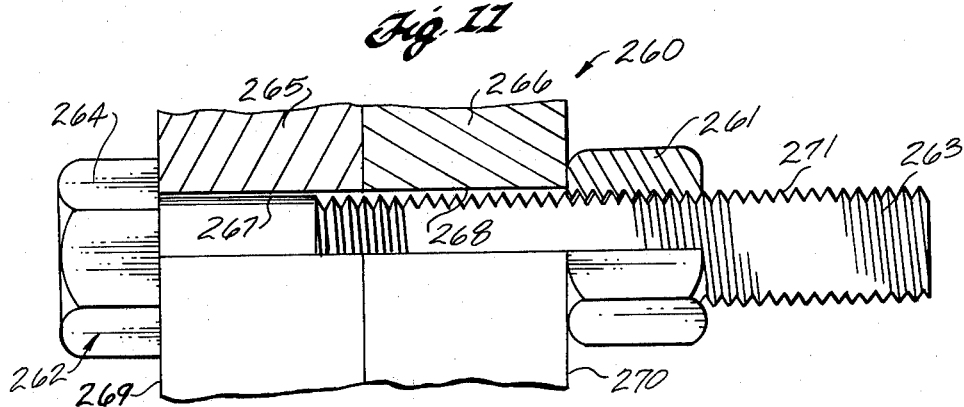
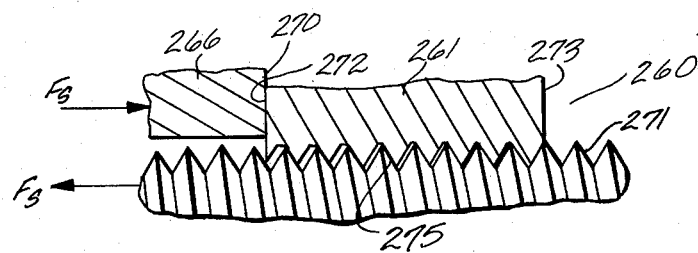
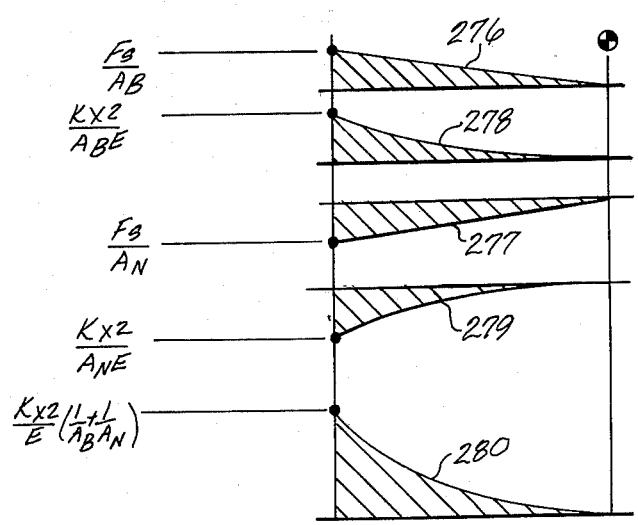
Fig. 11
Fig. 12

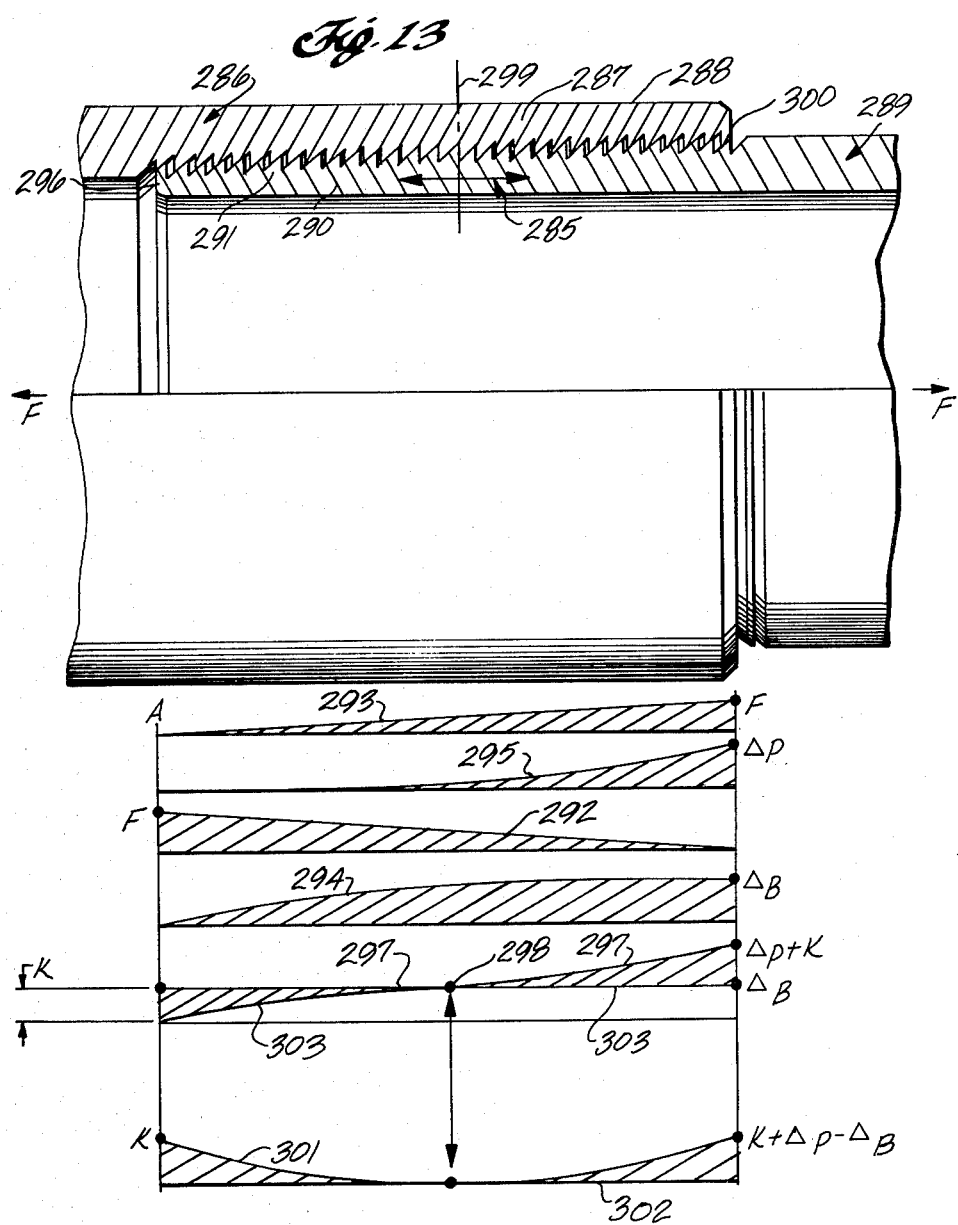

THREADED CONNECTION USING VARIABLE LEAD THREADS

FIELD OF THE INVENTION

This invention pertains to threaded connections. More particularly, it pertains to a threaded connection for connecting first and second members in which the connection is to be subjected in use to an axial load of specified magnitude; the threads have a variable lead characteristic which causes the threads to be uniformly loaded when the connection is subjected to such load.

INCORPORATION BY REFERENCE

The drawings and descriptions of U.S. Pat. No. 4,023,630 are incorporated by reference into this document as though fully set forth herein.

BACKGROUND OF THE INVENTION—THE NATURE OF THE PROBLEM ADDRESSED

There are many and diverse situations where threaded connections are used to interconnect two members which are subjected, after the connection has been made, to loads along the axis of the threads. Usually the magnitude of the applied axial load is known with more or less precision as a result of analyses made in conjunction with the design of the connection. The thread characteristics are specified with reference to and in consideration of the load which the connection is designed to carry or withstand; such load is often referred to as the "design load".

Conventional threaded connections use threads of constant pitch in which the threads have an appropriate one of several standard profiles or a specially designed profile. Such threads have the common feature that when threaded together to a "hand-tight" or a lightly loaded condition, all the engaged threads are in contact with each other. However, as axial loads are applied thereafter to the connection, the two members involved in the connection strain (deform) in response to the applied load, thus causing the increasing load to be carried by progressively less and less of the length of the engaged threads. Ultimately, the applied load may reach a magnitude sufficient to cause the threads actually carrying the load to begin to fail in shear, a phenomenon commonly called "stripping". Once stripping begins and the applied load is not reduced, it proceeds progressively along the entire threaded connection causing more and more of the thread length to fail in shear until all of the threads in the connection are stripped and the two members in the connection separate from each other.

As an example, consider the case of a bolted-down access door into a pressure vessel. The cover is connected to the exterior of the vessel by use of externally threaded studs which pass from the vessel through corresponding holes in a flange of the door into engagement with internally threaded nuts. Each stud and nut set forms the two members involved in a threaded connection. Each threaded connection is initially made up to the desired tightness by screwing the nut down on the stud against the door flange. At this point, the load faces of the nut threads (the faces of the nut threads which face away from the door) are essentially fully engaged with the stud thread load faces (the faces of the stud threads which face toward the door and which are engaged with the nut thread load faces). The end of the nut adjacent the door is compressed against the door flange; this compression produces tension in the stud. Assume that no pressure relief mechanism is provided for the pressure vessel so that pressure in the vessel can increase above the desired design pressure. Pressure in the vessel begins to increase. This pressure increase is applied to the door, urging the door away from the vessel along the door mounting studs. Movement of the door away from the vessel is resisted by the nuts which are further compressed, and by the studs which experience increased tension. This compression is a maximum at the end of the nut bearing against the door, and the tension in the stud is manifested in full at the stud thread which is engaged with those nut threads closest to the door. The nut and the stud are made of metal. The compressive load applied by the door to the nut causes the nut metal to strain (deform) in compression, i.e., to shorten axially; such strain is maximum in the nut adjacent the door and decreases progressively proceeding along the nut away from the door. The stud tension causes the stud to strain in tension, i.e., to elongate axially; such strain is uniform in the stud along its length not engaged with the nut and decreases throughout that portion of its length engaged by the nut. The important point is that the material of the nut immediately adjacent the door, and the coaxially adjacent material of the stud are urged by the applied load (the pressure in the vessel) to move in opposite directions along the thread axis, and such opposite movement is resisted by the threads which are loaded in shear. The thread shear loading is maximum immediately adjacent the door-to-nut interface, and decreases proceeding along the threads away from such interface. If the pressure-related load on the threaded connection increases above the design pressure level (i.e., the design load level for the threaded connection), the shear strength in the threads will be exceeded at some point, if the stud does not first fail in tension. The threads will begin to shear (strip) immediately adjacent the door-to-nut interface. The loads applied to the connection will be transferred to the remaining threads which will similarly be overloaded so as to fail in shear. The result is that the threads progressively shear off until the nut separates from the stud and the connection fails entirely.

The situation described above could not occur if, at the time the pressure in the vessel reached design pressure, thereby presenting the design load to the threaded connection, all engaged threads in the connection were uniformly and lightly loaded, rather than nonuniformly loaded with some of the threads heavily loaded and others only very lightly loaded. If all engaged threads are uniformly and lightly loaded when the connection is subjected to the design load, the connection would be much better able to withstand applied loads substantially in excess of the design load. Such threaded connections are presently not known, but a need for such connections exists for use in many different situations.

SUMMARY OF THE INVENTION—THE PRIOR ART

Insofar as presently known, there is no prior art directly or indirectly in point to the problem identified and reviewed above, or in point to the present invention which provides a solution to such problem.

SUMMARY OF THE INVENTION

This invention addresses the problem and the need identified in the foregoing remarks. It provides an answer to the problem and thereby fulfills the need. This invention provides a novel and unobvious threaded connection of significantly enhanced strength. The threads of the connection are so defined that when the connection is assembled, even including any initial preload condition desired, and is thereafter subjected to an axial load of specified magnitude (e.g., a design load), the threads as so loaded are stressed uniformly and relatively lightly throughout the connection. At the design load, all portions of the threaded connection are equally loaded and so behave in a manner akin to a conventional threaded connection when made up but not subjected to any load. Thus, the present connection, once made up or assembled, increases in strength as it is progressively subjected to axial load up to its design load, and thereafter it behaves like a conventional threaded connection as initially made up.

The threaded connection of this invention is simple to fabricate with proper equipment, and has been found to be highly reliable. The invention makes possible the provision of very strong and compact threaded connections capable of withstanding applied loads substantially larger than is possible with previously known connections of comparable dimensions.

Generally speaking, in terms of structure, this invention provides an improved connection of threadably connecting first and second members which are subjected, after assembly of the connection, to a load applied to the members in a selected direction along the axis of the threads; in this connection the threads, when so loaded by a load of specified magnitude, are uniformly stressed. The threads are of basically constant pitch throughout their lengths along the members. Each of the threads has a load face which is loaded by the load face of the other thread when the load of specified magnitude is applied in the selected direction. The load faces of the threads on at least one of the members are defined to have a lead which varies from a constant lead by an amount which, at any given location along the threads, is equal to the net relative deflection due to strain of the members along the axis at such location in response to the application of the load of specified magnitude to the members in the selected direction.

Stated in another way, the thread load faces have associated with them a reference point which is common to both load faces. The reference point is established at that point along the length of the connection at which relative axial strain between the members is zero when (1) the members are threaded together under a selected preload condition, if any, and (2) the members are subjected to the application in the selected direction of the load of specified magnitude. The axial spacing of the load faces of the threads on at least one of the members is defined, in the unstrained condition, to produce a lead which varies from a constant lead (i.e., the lead associated with the constant pitch of the threads), proceeding along the threads away from the reference point, by an amount which, at any location along the threads, is equal to the amount of net relative deflection due to strain of the members along the thread axis relative to the reference point in response to loading of the member in the selected direction by (1) the preload condition, if any, and (2) the load of specified magnitude.

INTRODUCTION TO DRAWINGS AND DETAILED DESCRIPTION

As noted above, this invention has utility in and applicability to axially loaded threaded connections in general. The invention was conceived and developed for use in drilling jars, and it is in that context that the invention, its design rationale and considerations, and the equipment and procedures useful to fabricate the invention, are set forth by way of example and illustration in compliance with applicable statutes and other requirements. This presentation should not be considered as detracting from the broad utility of the invention.

A drilling jar is an assembly which is connected into a drill string in the course of drilling an oil or gas well. The jar is located in the drill string just above the drill collars which usually are positioned in the drill string closely above a rotary drill bit. The jar is provided in the drill string for use in the event that, for any of a number of reasons, the string should become stuck in the borehole and cannot be lowered or raised in the hole. The jar is operated to, in effect, hammer the drill string up or down, as appropriate, and thus jar the drill string loose from its stuck condition.

It is because the presently preferred embodiment of this invention exists in a drilling jar that U.S. Pat. No. 4,023,630 has been incorporated herein by reference. That patent has been incorporated by reference to simplify the following description. That patent does not constitute prior art pertinent to the present invention; its content merely sets forth in detail the basic structure and mode of operation of the drilling jar in which this invention presently preferably is embodied.

The invention is described hereinafter first by a general description of the structure of a drilling jar in which the invention is embodied. The details of a novel thread used in the present practice of this invention is then described. Next, there is set forth the principal aspects of the factors relevant to the design of an exemplary threaded connection according to this invention, and of the rationale and steps in such design; this is done to make clear how to use and, broadly, how to make a threaded connection according to this invention. There is then set forth a brief description of the presently preferred way to make the exemplary embodiment described in detail. Finally, there are set forth descriptions of other embodiments of the present connection, with remarks pertinent to the manufacture of these and other embodiments of the invention.

To facilitate an understanding of the accompanying drawings and the following descriptions, it is suggested that the descriptions of U.S. Pat. No. 4,023,630 first be read and understood. In the following text, reference numerals below 200 refer to structural features shown and described in detail in U.S. Pat. No. 4,023,630; reference numerals 200 and higher pertain to structural features set forth in the accompanying drawings. The following description presumes that the reader is familiar with the structure described in U.S. Pat. No. 4,023,630.

U.S. Pat. No. 4,023,630 has counterparts in other countries as follows:
Canada Patent No. 1,056,365
France Patent Application No. 77 00707
Great Britain Patent No. 1,548,821
West Germany Patent Application No. P 27 01 195.6

DESCRIPTION OF THE DRAWINGS

The above-mentioned and other features of this invention are more fully set forth in the following detailed description of the presently preferred, an exemplary, and other embodiments of the invention, which description is presented with reference to the accompanying drawings, wherein:

FIG. 1 is a fragmentary view of a well drilling jar which provides the environment for an exemplary embodiment of the invention, and in which the jar structure is shown in longitudinal cross-section above the jar longitudinal centerline and in longitudinal elevation below the centerline;

FIG. 2 is an enlarged fragmentary longitudinal cross-section view of the improved threaded connection between the torque drive mandrel and the notched mandrel of the jar shown in FIG. 1, and in which the lock nut shown in FIG. 1 has been deleted to facilitate description of the essential properties of the connection;

FIG. 3 is an enlarged longitudinal cross-section view showing a novel thread arrangement used in the connection depicted in FIG. 2;

FIG. 4 is a diagram illustrating the stress and strain (deflection) curves pertinent to a rod of uniform cross-section subjected to a uniformly distributed axial load over a portion of its length;

FIG. 5 is a longitudinal loading, stress and strain representation pertinent to the externally threaded component of the connection shown in FIG. 2 when subjected to all design loads;

FIG. 6 is a longitudinal loading, stress and strain representation pertinent to the internally threaded component of the connection shown in FIG. 2 when subjected to all design loads;

FIG. 7 is a representation of the net relative longitudinal (axial) strain pattern produced by summation of the strain patterns set forth in FIGS. 5 and 6, and of the distribution of the thread load face total lead variation amount, both presented with reference to the externally threaded member shown in FIG. 5;

FIG. 8 is a longitudinal elevation view, partially in cross-section, of the lock nut for the threaded connection shown in FIG. 1;

FIG. 9 is a view similar to FIG. 2 showing the connection as initially made up and preloaded but without the locknut, and showing the stress distribution in the box of the connection;

FIG. 10 is a view similar to FIG. 9 showing the connection as initially made up with the locknut and preloaded, and showing the stress distribution in the box of the connection;

FIG. 11 is an elevation view, partially in cross-section of a threaded connection using a nut having a variable lead thread according to this invention;

FIG. 12 is an enlarged fragmentary cross-section view of a portion of the connection shown in FIG. 11 with pertinent stress, strain, and variable lead spacing curves; and FIG. 13 is an elevation view, partially in cross-section, of a tapered, non-shouldered variable-lead threaded connection with pertinent stress, strain, and variable lead spacing curves.

DESCRIPTION OF THE EXEMPLARY EMBODIMENT

FIG. 1 is a fragmentary longitudinal elevation view, in cross-section above longitudinal centerline 201, of a well drilling jar 200 which is generally similar to jar 10 shown and described in U.S. Pat. No. 4,023,630. To the extent jar 200 differs from jar 10 in aspects relevant to the present invention, such differences are shown in FIG. 1 which illustrates the upper end portion of jar 200 which is vertically disposed in use.

The upper end of jar 200 is defined by an internally threaded box portion 202 of a jar torque drive mandrel 203. This mandrel is axially hollow and forms a component of the inner tubular telescoping body element of jar 10. The internal threads of box portion 202 are arranged to mate with the standard thread configuration on the pin end of a length of oil well drill pipe, for example. The major portion of the length of the torque drive mandrel is disposed coaxially within the telescoping outer tubular body element of the jar which, in the case of jar 200, is composed of a torque drive sub 204, an up hammer sub 205, and an intermediate latch sub 206, among other components, all of which are threadably connected in serial order proceeding downwardly along the jar.

The box portion of mandrel 203 defines the largest diameter of the mandrel. Immediately below the box portion, the exterior of mandrel 203 is arranged to define male spline elements 207 which cooperate with female spline elements 208 defined in the interior of torque drive sub 204 immediately adjacent the upper end of the sub.

The lower end of box portion 202 defines a circumferential shoulder face 209 which faces downwardly along the jar. Face 209 is a down-hammer hammer face in jar 200 and cooperates with a down-hammer anvil face 210 defined at the extreme upper end of torque drive sub 204. During normal operation of jar 200, faces 209 and 210 are spaced about 8 inches apart along the length of the jar.

The lower end of the torque drive sub is connected to up hammer sub 205 to which the upper end of intermediate latch sub 206 is connected. The lower portion of the up hammer sub extends inside the upper extent of the intermediate latch sub around the lower portion of the torque drive mandrel. The extreme lower end of the uphammer sub defines a flat annular face 211 which, in jar 200, serves as the up-hammer anvil face.

Torque drive mandrel 203 defines an externally threaded pin 212 at its lower end. Pin 212 is engaged with an inter-rally threaded box 213 defined by the upper end of a notched mandrel 214 which comprises a further component of the inner tubular body element 12 of jar 10. A lock nut 215 is also threaded onto pin 212 into forceful abutment of its lower end with the upper end of box 213. The upper end of the lock nut defines a flat annular face 216 which, in jar 200, serves as the up-hammer hammer face. During normal operation of jar 200, faces 211 and 216 are spaced about 8 inches apart along the length of the jar.

Spline 207, 208 has an effective length of at least 16 inches. The spline serves to enable torque drive mandrel 203, and the other elements of the jar immovably connected to it, to move axially up and down along the jar axis relative to the torque drive sub and the other elements of the jar immovably connected to the sub. The spline also prevents rotation of these two sets of elements relative to each other about the jar axis.

The remaining structure of jar 200 not shown in FIG. 1 may be in accord with the illustrations and descriptions of U.S. Pat. No. 4,023,630.

A variable lead threaded connection 220 according to this invention is used to connect notched mandrel 204 and lock nut 215 to torque drive mandrel 203. This connection, as shown in FIG. 1, is a shouldered connection in that the extreme lower end of the torque drive mandrel defines a shoulder 221 which, in the assembled connection, is abutted against an opposing shoulder 222 defined at the base of box 213; also, the lower end of the lock nut defines a shouler 223 which is abutted against an opposing shoulder 224 defined by the extreme upper end of the box.

An exemplary embodiment of this invention is in a 6¼ inch jar 200. Certain of the element of such jar have dimensions as follows:

A. Torque Drive Mandrel 203:
  1. Outer diameter above pin 212: 3.750 in.
  2. Inner diameter: 2.25 in.
  3. Major diameter along threaded length of pin 212: 3.650 in.
  4. Minor diameter below threaded length, also minor diameter immediately above pin threads: 3.450 in.

B. Notched Mandrel 214
  1. Outer diameter of box 213: 4.75 in.
  2. Minor diameter (inner) of box threaded portion: 3.480 in.
  3. Major diameter (inner) of box at lower end of thread: 3.680 in.
  4. Inner diameter below box: 2.31 in.

(A more recently designed and presently preferred embodiment of this invention is in a 6¼ inch to 6¾ inch drilling jar in which the torque drive mandrel dimensions, set forth with reference to the foregoing dimensions of mandrel 203, are as follows:
  A. 1.—3.875 in.
  A. 2.—2.25 in.
  A. 3.—3.770 in.
  A. 4.—3.570 in.

The notched mandrel of such drilling jar has correspondingly different dimensions. The present invention is set forth herein in detail with reference to the exemplary embodiment of jar 20, rather than with reference to the more recent and presently preferred jar which reflects design changes having no relation to this invention. The design analyses and considerations set forth herein make it clear how the more recently designed jar is configured in accordance with this invention; such jar has a variable lead thread length of 6.875 inches along the pin and a net relative strain zero axis 2.500 inches from the shoulder end of the pin along the axial extent of the variable lead thread which is defined entirely in the pin of the improved connection.)

FIG. 2 is an enlarged fragmentary longitudinal cross-sectional elevation view of variable lead threaded connection 220 which is used in jar 200 to connect torque drive mandrel 203 to notched mandrel 214. In FIG. 2, box 213 of mandrel 214 is shown without lock nut 215; this has been done for the sake of simplifying the following description of the design of connection 220—it will be shown below that the omission the lock nut has no effect upon how the connection is loaded in use and therefore has no effect upon the design analysis.

In jar 200, connection 220 is subjected to several types of loads as the jar is used. During normal drilling operations, the connection will be subjected to reversing bending loads which range from zero for a straight hole to a relatively small value for a non-straight hole. Static tensile loads of modest levels will be applied to the jar when drilling in tension (the jar may be cocked or it may be disposed in its extended condition), or when pulling on the jar to trip the jar upward for an up-hammer operation of the jar. Compressive loads of modest level may be applied to the connection in the course of tripping the jar to initiate a down-hammer operation of the jar. Also, upwardly acting impulse loads, tending to pull pin 212 out of box 213, will be applied to the connection after the jar has been tripped to initiate an up-hammer operation of the jar. These impulse loads occur as the upward momentum of the drill string above the jar is transferred to the stationary outer body of the jar, and to other elements of the drill string below the jar, as up-hammer hammer face 216 impacts up-hammer anvil face 211. These impact loads are of large magnitude, and the stresses generated in connection 220 as a result can be very high if the connection is conventionally defined.

The actual impact loads to which up-hammer connection 220 will be subjected in use is a function of many variables, most of which are determined by conditions in the hole being drilled. Such conditions include drill string length, weight per foot and amount of bending, sectional properties of the drill string, the positioning in the drill string of various ones of its components, the position of the stuck portion of the drill string, among other conditions. It is therefore seen that it is not a simple matter to determine with any certainty the actual load which connection 220 might see during up-hammer operation of jar 200. The objective of the use of variable lead threaded connection 220 in jar 200 is to provide a connection which has a strength at least equal to the axial strength of torque drive mandrel 203 at its weakest point which is in the region of the runout of the external threads provided in connection 220. That is, connection 220 is so arranged that it is not the weakest point in the string of elements provided in jar 200. It is also desired that such improved threaded connection be provided in the most compact form possible, i.e., in a form which uses threads which require minimum removal of metal from pin 212 and from box 213.

In the exemplary drilling jar having the dimensions set forth above, the expected weakest location in the string of elements with which connection 220 is associated is in pin 212 just above the threads of the connection. At this location the pin cross-sectional area is 5.345 square inches. The torque drive mandrel is fabricated of AISI 4340 steel having a maximum tensile stress of 149,000 psi. The maximum static tensile strength of the torque drive mandrel is 796,400 pounds. Connection 220 is designed to develop its maximum strength when the dynamic impact load applied to up-hammer hammer face 216 (i.e., when the dynamic tension load in the mandrel) is 1,000,000 pounds. Connection 220 is also designed to be subjected to a static compressive make-up load between shoulders 221 and 222 of 326,000 pounds.

A novel thread 225 is shown in detail in FIG. 3. This thread is used in connection 220. The thread has the characteristic that its engaged height $h_e$ is ½ (one-half) the axial width w of the thread across the portion of the thread subtended by the engaged height. The thread therefore has approximately equal strengths in shear and in compression; this approximate equality is justified by the fact that the material (steel) is generally regarded as being substantially twice as strong in compression as it is in shear. Thread 225 has a modified American buttress profile. Buttress threads are useful for high stress in one direction only and with a minimum of bursting or expansion load. American buttress threads conventionally have a 7° load flank pressure angle and a 45° opposite flank angle. (In a thread, the side of the thread which is subjected to load in use is called the "load flank.") In thread 225, the load flank is also the lead flank; the "lead flank" of a thread is defined as that side or face of the thread which, when the thread is about to be assembled with a mating thread, faces the mating thread, and the opposite side of the thread is called the "following side".

In addition to the relation $2h_e = w$, other novel properties of thread 225 are that root radius R is the largest radius possible consistent with the clearance "a" and the effective height $h_e$ as determined above. Also, the thread profile is cropped more substantially at the crest than is the case in a conventional American buttress thread. Thread 225, therefore, is essentially the strongest thread which can be provided in connection 220 with the least removal of metal from pin 212 and from box 213.

Thread 225 has the following dimensions, the natures of which are set forth in FIG. 3:

| | |
|---|---|
| $h_n$ = 0.100 in. | a = 0.005 in. |
| $h_e$ = 0.068 in. | r = 0.010 in. |
| h = 0.073 in. | R = 0.028 in. |
| p = 0.200 in. | |
| $D_{PS(max)}$ = 3.559 in. | $D_{PS(min)}$ = 3.549 in. |
| $D_{PN(max)}$ = 3.583 in. | $D_{PN(min)}$ = 3.573 in. |
| $D_{P(nom.)} = \frac{1}{2} (D_{PN(max)} + D_{PS(min)})$ = 3.565 in. | |
| $A_{th(min.)}$ = 0.650 sq.in./thread | |

By reference to accepted design equations (see *Design of Machine Elements*, M. F. Spotts, 5th Ed., pg. 250) the make-up torque for connection 220 can be obtained where the connection components and the thread between the components have the dimensions and characteristics set forth above. In the case of the exemplary jar described above, it was determined that a face-to-face load of 326,000 pounds is appropriate between the faces of shoulders 221 and 222 in the assembled connection, and that a torque of 14,250 foot-pounds would be required to produce such a shoulder load.

Taking into consideration the tolerances pertinent to thread 225, it was decided that for subsequent design purposes, the minimum contact area of the thread (0.650 sq.in./thread) should be used.

The total load to be supported by the pin 212 of connection 220 in the exemplary jar under consideration is the sum of the axial tensile impact load (1,000,000 pounds) plus the reaction in the pin of the load (326,000 pounds) between shoulders 221 and 222. When these loads are considered as applied to the threads described above, and assuming that the stress in the thread load faces is to be 68,000 psi when the connection is subjected to all design loads, it can be shown that for the foregoing thread, having a pitch of 0.20 in. (5 threads per inch), a total threaded length of 6.00 inches is required for pin 212. The factor of safety is approximately 2.0.

It will be recalled that a basic objective of this invention is to provide in connection 220 a threaded arrangement which is *uniformly stressed* when the connection is subjected to all design loads. It will also be appreciated that the foregoing descriptions of thread 225 have been in terms of a *constant pitch* cylindrical thread, i.e., a thread defined both externally and internally in cylindrical surfaces. These considerations should be kept in mind in the following description of the design rationale pertinent to the definition of the *variable lead* aspects of connection 220 and the factors which are relevant to such definition. This rationale is presented with reference to FIGS. 4-7 and to the equations which are set forth in Table I.

FIG. 2 is an enlarged cross-sectional elevation view of connection 220 having threads 225 (shown in their elementary form rather than their true form of FIG. 3) with the pertinent net relative axial strain distribution characteristic applied only to external threads 226 on pin 212, rather than 1) applied only to internal threads 227 on box 213 or 2) applied to both external threads 226 and internal threads 227. FIG. 2 shows connection 220 in its roughly assembled state (screwed together "hand-tight") before the application of the desired make-up torque sufficient to impose the design preload compression between shoulder 221 and 222, and before application of the design load associated with an up-hammer impact in the jar. In such state, threads 226 and 227 engage each other via their load flanks (the 7° faces of thread 225) at only a single point 228 which lies on a reference axis 229 disposed normal to the common axis of threads 226 and 227. In this state of the connection, the load flanks of threads 226 and 227 are spaced from each other at all locations along the length of the connection other than at point 228, and the amount of such spacing varies proceeding along the connection in either direction from point 228. When the design preload is applied to the connection, the load flanks of threads 226 and 227 are fully engaged at all locations in the connection between point 228 and the place where shoulders 221 and 222 abut, but not otherwise; see FIG. 9. When the design load associated with an up-hammer impact in the jar is applied to the connection, all load flanks of threads 226 and 227 are engaged with each other, and all threads in the connection are uniformly and relatively lightly stressed.

DESIGN OF CONNECTION 220

In order that connection 220 can have the property that the threads in the connection are uniformly stressed when subjected to all design loads, it is necessary to ascertain the condition of each of the threaded members in the portions of their lengths in which the threads are defined, when those members are subjected to the design loads. The condition of the members, i.e., pin 212 and box 213, along the length thereof subtended by the engaged threads is all that is important in terms of the thread variable lead characteristic. The principal conditions of interest are the net relative axial strain (more precisely, net relative axial deformation or elongation due to axial strain) of the overall connection over the engaged threaded length of the connection, and the distribution of such strain over such length. The net relative axial strain is in turn the result of the axial strains of the pin and of the box, and of the distribution of these axial strains. Once the net overall relative axial strain distribution characteristic has been ascertained, it can be allocated in any way desired between the internal and the external threads involved in the connection.

FIG. 4 represents a metal rod 230 of uniform area A subjected to a uniformly distributed axial load w over a portion of its length between points 1 and 2 spaced a distance l along the rod. Curve 231 in FIG. 4 describes the stress in rod 230 at points 1 and 2 and at any location between these points. Curve 232 represents the axial elongation (deflection or net strain) in the rod relative to point 1 at any location in the rod at and between points 1 and 2 due to the presence of uniformly distributed axial load w applied to the rod between points 1 and 2. The stress (curve 231) in rod 230 is given by Equation (1) in Table I, and the deflection (curve 232) is given by Equation (2) in which E is the modulus of elasticity of the material of rod 230.

FIGS. 5 and 6 apply the principles shown in FIG. 4 to pin 212 and to box 213, respectively. However, in order that these principles ma be applied, it is necessary to consider the specific geometry of each of these components of connection 220 and the loads applied thereto. In both FIGS. 5 and 6, points 3 and 4 correspond to the ends of the length of effective engagement between threads 226 and 227; as shown above, this length is 6 inches for the exemplary connection under consideration.

As to pin 212 shown in FIG. 5, the relevant parameters are:
shoulder load $F_S$ at 221: 326,000 lbs.
Impact load $F_I$: 1,000,000 lbs.
Area A at and between points 3 and 4: 5.95 sq. in.
Modulus of Elasticity E: $30 \times 10^6$ psi
Uniformly distributed axial load $w = [(F_S + F_I)/6]$: 221,000 lb/in.

Curve 233 is the stress distribution curve pertinent to pin 212 when it is subjected to loads $F_S$ and $F_I$. Curve 233 has an end point 234 where the stress in the pin is −54,790 psi (compression), an opposite end point 235 where the stress in the pin is +168,070 psi (tension) and varies linearly between the two end points. The positive x (+x) direction is defined as being toward the shoulder, and the negative x (−x) direction is defined as being away from the shoulder with the origin being the zero-strain reference axis 229 (see FIG. 2). In the deflection (net relative strain) curve 236 of FIG. 5, compressive strain (shortening) occurs in the positive x direction and tensile strain (elongation) occurs in the negative x direction.

Because curve 233 is linear between points 234 and 235, it provides a basis for determining the location of the reference axis 229 between the ends of threads 226 and 227. This location is 1.475 inches to the left from point 4 and 4.525 inches to the right from point 3. (This is the location where both stress curves 232 and 240 and both deflection curves 236 and 243 cross the zero stress and strain axis 229.) When Equation (2) is evaluated for pin 212 using the values of A and E set forth above, the result is Equation (3) which is the mathematical description of curve 236 relative to its base 237. Curve 236 has a magnitude of 0.00135 in. at end point 238, and a magnitude of 0.0127 in. at end point 239.

The relevant parameters of box 213 (see FIG. 6) are:
Shoulder load $F_S$ at 222: 326,000 lbs.
Impact load $F_I$: 1,000,000 lbs.
Area A at and between points 3 and 4: 7.683 sq. in.
Modulus of Elasticity E: $30 \times 10^6$ psi
Uniform axial load w: 221,000 lb/in.

In FIG. 6, stress curve 240 has a magnitude of 42,430 psi (tension) at end point 241 and a magnitude of −130,160 psi (compression) at end point 242. When Equation (2) is evaluated for box 213 using the values of A and E set forth above, the result is Equation (4) which is the mathematical description of strain curve 243 as to strain of the box toward and away from reference axis 229. Curve 243 has a magnitude of 0.00104 in. at end point 244 and a magnitude of 0.00981 in. at end point 245.

In connection 220, it is the net relative strain (net relative axial deflection) between pin 212 and box 213 at any location along the engaged threaded length of the connection which is the strain (deflection) condition of ultimate interest; axial deflection of the pin or the box at any point along its length is the summation of the strain for each increment of length of the member of interest, and the net relative axial deflection between these members at any point along the connection is the item of information which is ultimately used to define the variable lead aspect of the threads in connection 220. This information is obtained by arithmetically summing curves 236 (describing strain in the pin) and 243 (describing strain in the box). This is the same as adding Equations (3) and (4). When this is done, the result is curve 246 (see FIG. 7) and Equation (5). Curve 246 is presented in FIG. 7 with reference to pin 212 because, as noted above, in connection 220 the net relative strain (deflection) accommodation of the connection is defined entirely in thread 226 formed in the exterior of pin 212. The next step in the process of design of connection 220, then, is to determine how the information given by curve 246 and Equation (5) is to be applied to thread 226, and particularly to the load flanks of the thread.

It will be recalled that threads 226 and 227 have been described above as being basically constant pitch threads having a pitch of 0.20 in. Such threads are called "5 pitch" threads in that there are 5 threads per inch axially of each component of connection 220. In such threads, the lead (distance advanced per turn) is 0.20 in. per turn, or x=0.200 N is the number of turns. Thus, when curve 246 is described in terms of turns of the pin, the result is Equation (6) which reduces to Equation (7). In both of Equations (6) and (7), N is measured in the $+x_1$ and $+x_2$ directions from reference axis 229.

Curve 246 has a magnitude of 0.00239 in. at end point 247 and a magnitude of 0.02248 in. at end point 248. These are the amounts to be removed from the 7° load face of evenly spaced 5 pitch thread 226 at each end of the thread. The 7° face of thread 226 is the lead face of the thread. The amount by which the lead face of thread 226 must be relieved at any point along its length from the constant lead associated with the basic constant pitch characteristic of the thread is ascertained by differentiating Equation (7) as a function of N, the basic lead of the thread per turn. Such differentiation produces Equations (8) and (9) which are pertinent, respectively, to thread 226 to the right and to the left of reference axis 229.

Curve 250 (FIG. 7) describes the variation in the lead of thread 226 as a function of the number of turns of the thread from reference axis 229. At end point 251, curve 250 has a magnitude of 0.20065 in. per revolution (turn); its magnitude at end point 252 is 0.19801 in. per revolution (turn). It is inconvenient to describe the variation in the lead of thread 226 with reference to a point intermediate the length of the thread. It is better to describe this property of the thread with reference to its starting point adjacent shoulder 221; in these terms, curve 250 is described by Equation (10). Thus, proceeding along thread 226 from its starting point adjacent shoulder 221, the lead (7°) face of the thread should show a change in lead of $-8.784 \times 10^{-5}$ in. per revolution per revolution. When thread 226 has this characteristic in connection 220, in which thread 227 has a constant lead throughout its length, all 7° faces of threads 226 and 227 will be engaged with each other when all design loads are applied to the connection.

As shown above, there are two design loads pertinent to shouldered threaded connection 220. These are the static preload design load of 326,000 lbs. and the dynamic impact design load of 1,000,000 pounds.

Connection 220 is assembled by screwing threads 226 and 227 together. When shoulders 221 and 222 first contact, the thread load faces are engaged only at point 228 which is located 1.475 inches to the left from the beginning of thread 226 adjacent shoulder 221. The connection is then subjected to the requisite make up torque to create the desired compressive preload force of 326,000 pounds between shoulders 221 and 222. As this preload force is being generated, the pin strains in compression (shortens) between point 228 and shoulder 221, whereas the box strains in tension (extends) between the same point and shoulder 222. This net relative deflection of the pin and the box due to these strains brings the thread load faces to the right of point 228 progressively closer and closer together until all such faces contact when the desired preload condition has been created. The thread load faces to the left of the zero stress reference axis 229 are not in contact because the pin and box in this area are unstressed, and thus are unstrained, and these are undeflected relative to each other.

When connection 220, after assembly as described above, is subjected to an up-hammer impact load in jar 200, a short term compressive load of up to 1,000,000 pounds is applied to box end face 224, and a tensile load of the same magnitude is applied to mandrel 203 above pin 212. These loads cause the load faces of the pin and the box to the left of point 228 to move into full engagement. This load is absorbed in the connection entirely to the left of point 228; the preload condition in the connection is undisturbed, and there is no tendency for the connection to unscrew itself. When the impact loads are applied to the connection, threads 226 and 227 are fully engaged over their entire length and are subjected to uniform stress levels which are well below the stress levels productive of inelastic deformation of the threads. At such time, connection 220 behaves as a conventional threaded connection having constant lead and constant pitch internal and external threads but subjected to no significant axial load; this occurs under conditions in which a conventional threaded connection would be on the threshold of failure in shear. For applied loads in excess of design loads, connection 220 then begins to perform as an unloaded conventional threaded connection; it can accommodate substantial excess applied loads before it reaches the threshold of failure. Most likely, before connection 220 begins to fail, some other component of jar 200 will have failed under the excess applied loads.

The preceding description makes apparent the factors, variables and processes which must be observed and followed in designing a variable lead threaded connection according to this invention. For a shouldered connection, regardless of whether the connection is a straight threaded connection (in which the internal and external threads are formed in cylindrical surfaces), or the connection involves tapered threads (in which the internal and external threads are formed on conical surfaces) once the desired thread profile has been selected and its strength characteristics ascertained, the design loads pertinent to the desired connection are established. The design loads may include a pre-load condition similar to the 326,000 lbs. compressive preload condition encountered at the interface between shoulders 221 and 222 in the exemplary connection described in detail above. It will be appreciated, however, that if no pre-load condition is encountered in the desired connection, then the reference axis of the connection, i.e., the axis corresponding to axis 229 in the preceding description, will be defined at one end or the other of the connection, as appropriate. The nature and extent of the strains (deflections) encountered in the components of the connection, over the portions of their lengths subtended by the engaged length of the threads when the connection is assembled and subjected to all design loads, are then ascertained. These strain (deflection) characteristics are determined separately for each of the threaded components involved in the connection. Appropriate strain distribution curves or equations, similar to curves 236 and 243 shown in FIGS. 5 and 6 hereof or similar to Equations (3) and (4), are defined. These individual strain distribution curves or equations are then arithmetically added to obtain a composite strain distribution curve or equation which describes the net relative axial deflection due to strain which would be seen by the threaded connection at any location along its engaged length.

The information pertinent to net relative strain (i.e., deflection due to strain) throughout the length of the connection is then used to determine net variation in the lead of the load faces of the threads involved in the connection throughout the length of the connection. It is emphasized that the information descriptive of the lead variation, preferably expressed as lead differential per turn, can be distributed entirely along the load face of the external thread (as is the case in connection 220 described above), or it may be distributed entirely along the load face of the internal thread, or it may be distributed in any proportion desired between the load faces of the internal and external threads. Inasmuch as internal threads are somewhat more difficult to form than external threads, it is preferred that, where circumstances permit, lead variations be assigned to the external thread. As made clear from the followiing descriptions, however, there are instances where practical considerations preclude the definition of the variable lead characteristic in the external thread. Once the appropriate lead variation information, preferably expressed in lead variation per revolution per revolution of the pertinent thread, has been ascertained, the variable lead thread may be manufactured.

MANUFACTURE OF CONNECTION 220

The presently preferred manner of making variable lead external thread 226 in accord with the preceding description is to first machine into the exterior of pin 212 a constant pitch thread having the desired profile, i.e., the profile illustrated in FIG. 3. Thread 225 is therefore machined in the pin as a fully finished constant pitch thread in which the load face of the thread has constant lead throughout the length of the thread. Thereafter, the load face of external thread 225 is machined away at the rate of $8.784 \times 10^{-5}$ inches per turn. Preferably this is done on a numerically controlled machine tool rather than on a manually operated machine tool. As will be seen from the preceding description, the amount of material which must be cut away from the constant lead load face of the thread varies very slightly, but continuously, throughout the length of the connection. In order that the variable lead thread may properly be defined, the rate of travel and rate of change of travel of the cutting tool must be very precisely controlled as a function of the turns of the workpiece. Such adjustments in the travel of the cutting tool axially of the workpiece cannot reliably be performed by hand using conventional machine tools in which axial rate of travel of the cutting tool as a function of workpiece revolutions is a constant and not variable except by hand. It is therefore believed necessary that the variable lead thread described above be machined on a numerically controlled machine tool which allows the rate of travel of the cutting tool axially of the workpiece to be precisely adjusted continuously with uniform rotation of the workpiece as a function of the total number of turns of the workpiece from the starting point.

As shown by curve 250 in FIG. 7, the rate of change of cutting tool advance along the workpiece as a function of turns of the workpiece is constant (i.e., the lead variation is linear with turns of or axial distance along the workpiece) for the second order parabolic curve defined by curve 246. It will be appreciated that, if for some other connection the net relative strain distribution curve (the curve analogous to curve 246 for connection 220) is a third or higher order parabolic curve, then the lead rate-of-change curve (the curve analogous to curve 250 of FIG. 7) will be a second order or higher parabolic curve. This is true because curve 250 is, in effect, the result of a first differentiation of curve 246.

Variable lead thread 226, described in detail above, has been fabricated effectively and reliably by use of a Lodge and Shipley numerically controlled lathe, Model Profiturn 40 with a General Electric Series 550 Optimizer Control. The machine control is equipped with a variable lead thread cutting option. This machine tool, as presently programmed, is capable of handling only a linear variation of lead as a function of workpiece turns. As shown above, the lead variation described by curve 250 is linear. However, it will be recognized that the present invention can be applied to tapered threads which might involve a nonlinear rate of change of lead due to the net relative strain curve (analogous to curve 246) being other than a second order parabola due to a varying cross-section of either or both of the components of the connection over the threaded length of the connection.

THE LOCK NUT IN CONNECTION 220

It was stated above, concerning FIG. 2, that the structure shown in FIG. 2 is a simplification, for purposes of explanation of this invention, of the actual structure of drilling jar 200 which is shown in FIG. 1. Drilling jar 200 includes lock nut 215 in association with connection 220, whereas FIG. 2 does not show the lock nut. It was earlier stated that the presence of lock nut 215 in association with connection 220 does not affect the connection in terms of the factors which are pertinent to its definition or its design rationale.

In the structure shown in FIG. 1 which includes the lock nut, external thread 226 is designed according to the design rationale set forth in detail above with reference to FIGS. 4–7, except that the variable lead thread may be, but preferably is not, defined in the exterior of pin 212 in an extended manner as though curves 246 and 250 extended approximately 2.5 inches further to the left of reference axis 229 than represented in FIG. 7. In other words, external variable lead thread 226 may be defined in pin 212 according to Equation (10) over a distance of approximately 8.5 inches from its inception adjacent shoulder 221. In practice, however, it is preferred (as shown in FIG. 10) to interrupt the constant lead thread initially machined in the pin in the plane of box end face 224 and to define the variable lead characteristic in the portion of thread 226 in the portion of its length which is subtended in use by the box threads. The interruption in the male pin threads is shown at 259 in FIG. 10; this interruption facilitates formation of the variable lead characteristic in the load faces of thread 226 between the interruption and pin end 221. A variable lead characteristic is not needed in that extent of threads 226 which cooperate with lock nut 215 because such threads are engaged on their back or following faces.

Lock nut 215, as shown in FIG. 8, has an internal thread 255 defined along its inner diameter commencing immediately adjacent end 223 of the lock nut. The effective length of threads 255 is 2.50 inches proceeding toward nut end 216 from end 223. Between the inner end of threads 255 and nut end 216, the lock nut has an inner diameter, as at 256, which is slightly enlarged relative to the major diameter of thread 255 so that, above the threaded portion of pin 212, the inner diameter of the lock nut cooperates closely with the outer diameter of torque drive mandrel 203.

Nut threads 255 are defined to be identical with internal threads 227 of box 213 as set forth in detail in the preceding description. Thus, threads 255 have the profile of threads 225, shown in detail in FIG. 3, including a 7° load face 257 which faces toward nut end 223 and a 45° following face 258 which faces toward nut end 216. There is no variable lead characteristic defined in threads 255.

Lock nut 215 is used in association with connection 220, as shown in FIG. 1, to pretension the torque drive mandrel to the left of reference axis 229 (see FIG. 2), and to precompress the box in this same area. This is done to keep threads 226 and 227, engaged between pin 212 and box 213, from unscrewing during up-hammer operation of jar 200.

To assemble connection 220, including lock nut 215, the lock nut is first threaded onto pin 212 as far upwardly along the torque drive mandrel as possible. Notched mandrel 214 is then screwed onto the lower end of torque drive mandrel 203 until shoulders 221 and 222 abut each other, after which the box is torqued to the desired level on pin 212, as described above, to establish the desired compressive pre-load force between shoulders 221 and 222; this preload creates a tensile stress condition in the adjacent portion of box 213 as shown in FIG. 10 by curve 281 which describes the stress in box 213. The lock nut is then screwed down along external threads 226 into engagement of its end face 223 with box end face 224. The lock nut is then torqued to the desired level while holding notched mandrel 214; this method of assembly will prevent the torque drive mandrel 203 from unscrewing relative to notched mandrel 214 while the lock nut is torqued against the upper end of box 213. During this make-up procedure, the lock nut is statically loaded in compression against box end face 224, and this loading is borne by cooperation of the 45° following faces of threads 255 with the adjacent 45° following faces of external thread 226. In the presently preferred embodiment of connection 220, a compressive load of 250,000 lbs. is created between nut face 223 and box face 224; this compressive load creates a compressive stress condition in box 213 between end face 224 and reference axis 229, as shown by curve 281 in FIG. 10. The compressive load applied between faces 223 and 224 is balanced by a static axial thread load which is carried entirely by the 45° following faces of thread 226 within the lock nut. Due to the relatively high following face angle, a wedging action occurs which causes substantial thread friction. This thread friction helps to lock the threads so engaged between the pin and the lock nut. However, shouldering of the lock nut against notched mandrel end face 224 does not in any way affect either the initial shoulder load previously created between shoulders 221 and 222 or the tensile stress pattern in box 213 or the corresponding compressive stress pattern in box 212 (see curve 281 in FIG. 10). The compressive engagement of the lock nut against box end face 224, and the reaction of such compressive load on the pin threads above the upper end of the box, cause the box between end face 224 and reference axis 229 to deflect in compression, and also cause the pin above reference axis 228, i.e., to the left of axis 229, to deflect in tension. These deflections cause the 7° load faces of the box thread 227 to move progressively into contact with the adjacent variable lead pin threads for a short distance immediately to the left of reference axis 229; this is shown by the curved portion of curve 281 (FIG. 10) immediately to the left of reference axis 229. This deflection of the pin and the box immediately to the left of reference axis 229 does not in any way change the stress or strain patterns present in the pin and the box to the right of reference axis 229. The stress pattern produced in box 213 without and with the presence of lock nut 215 in connection 220 is shown in FIGS. 9 and 10 (curve 281), respectively. It will be observed that the stress pattern to the right of the reference axis is the same in both cases; it necessarily follows that essentially the same is true of the stress distribution pattern in pin 212 to the right of reference axis 229 whether or not the lock nut is present in association with the connection.

During up-hammer operation of jar 200, the lock nut, the notched mandrel and the variable torque drive mandrel threaded assembly is loaded dynamically by an impact load which is manifested compressively in the lock nut and box 213 and in tension in the torque drive mandrel. When such an impact load is applied to lock nut up-hammer hammer face 216, the lock nut threads 255 are loaded dynamically in a direction opposite to the static load applied to these threads as a result of the make-up process followed in securing connection 220 in the first instance. Since there is ample clearance provided between the 7° load faces of the lock nut and the 7° faces of pin thread 226 during application of the up-hammer impact load to the lock nut, there is a rapid reduction in the preload force first generated in the mating 45° faces of the lock nut and the pin threads. The impact load is transferred directly through the lock nut from face 216 to face 223 and into box 213 without being seen as an increase in load at any lock nut 45° thread face. The application of the impact load to the box causes the compressive stress in the box to the left of reference axis 229 to increase as shown by the broken line 282 associated with curve 281 in FIG. 10, without effect upon the tensile stress pattern previously created in the box by the compressive preload of pin 212 against shoulder 222. Immediately following application of the up-hammer impact load to the lock nut, the 45° faces of the lock nut threads resume the contact with the adjacent 45° faces of the pin thread which they had immediately prior to the impact.

Lock nut 215 provides in connection 220 approximately three times the frictional locking torque as would be encountered in an equivalent connection without the lock nut. Also, lock nut 215 provides a relatively inexpensive part which may be discarded and replaced if damaged beyond repair as a result of repeated up-hammering operation of jar 200.

FURTHER VARIABLE LEAD CONNECTIONS

FIG. 11 illustrates another threaded connection 260 in accord with this invention; FIG. 12 is also pertinent to this connection. Connection 260 involves an internally threaded nut 261 and a bolt 262 having a threaded shank 263 extending from a bolt head 264. The connection is used to clamp together two members 265 and 266, such as metal plates, having coaxial holes 267 and 268. The clamped members have opposite external surfaces 269 and 270, bolt head 264 being engaged with surface 269, and nut 261 being engaged with surface 270. Constant pitch, constant lead external threads 271 of appropriate design and profile are formed in the cylindrical exterior surface of bolt shank 263. The threaded portion of the bolt shank extends at least partially through hole 268 in member 260 and beyond surface 270 of member 266 for a distance at least equal to the axial extent of nut 261 between opposite end faces 272 and 273 (see FIG. 12) of the nut. Nut end face 272 bears against exterior surface 270 of clamped member 268; this end surface of the nut is referred to as the load face of the nut.

Internal threads 275 are formed in the nut. Threads 275 mate with bolt threads 271, and thus are basically constant pitch threads, but have load faces, i.e., faces opening toward the nut load face, which are defined to have a variable lead in accord with this invention.

Once the design load which connection 260 is to withstand has been ascertained, the distribution of this load in the nut and the bolt is ascertained. These load distributions and the resulting stresses produced thereby are represented in FIG. 12 by curve 276 which is pertinent to the bolt and by curve 277 which is pertinent to the nut. These load and stress distribution curves are defined relative to an origin selected to correspond to the outer unloaded face 273 of the nut. Then, consistent with the design procedure described in detail above, the strain distribution curves pertinent to the bolt and the nut in response to the application of the design load to the connection are ascertained. In FIG. 12, curve 278 is the bolt strain distribution curve, and curve 279 is the nut strain distribution curve. Curves 278 and 279 are then arithmetically summed to obtain curve 280 which is directly analogous to curve 246 set forth in FIG. 7. From the data provided by curve 280, the total cumulative variation in the lead of the load faces of thread 275 is determinable, and the distribution of this total lead variation amount over the length of the internal thread is likewise determinable as a function of the number of turns involved in thread 275 from nut end 273, i.e., from the zero relative strain reference axis.

When connection 260 is made up, the engaged threads in the plane of nut outer face 273 will not be stressed, but the engaged threads between the nut load and outer faces will be stressed and therefore strained. The outer face 273 of the nut is thus the location of zero net relative strain between the nut and the bolt shank. Thus, this location is selected as the reference axis for curves 276–280, and establishes the reference point relative to which the lead variation of internal thread 275 is defined per turn of the threads.

When connection 260 is subjected to the design load which is applied to nut load face 270 by member 266, the nut is compressively strained (shortened) and the bolt is tensilely strained (elongated). Thus, when the assembled connection is subjected to the design load, the load faces of the internal and external threads of the connection are fully engaged with each other throughout the full length of the connection, and at such time the engaged threads are uniformly stressed.

It will be observed that the connection shown in FIG. 11 is directly analogous to the nut and stud connection used as an illustrative example in the preceding description of the problem to which this invention is addressed; bolt 262 is analogous to the stud referred to in that discussion. If connection 260 were defined using conventional constant pitch threads with no variable lead in either or both of the load faces of the engaged threads, the threads immediately adjacent to the nut load face would be maximally stressed, and this stress level would decrease to zero proceeding along the connection threads toward the nut outer face.

Where a variable lead threaded connection according to this invention is practiced in the context of a nut and a bolt, it is preferred that the variable lead threads be defined entirely in the internal threads of the nut. This is so because, in the case of a nut and a bolt, it is usually not possible to identify the precise position that the nut will occupy along the bolt in the completed connection. If the variable lead threads were defined, at least in part, by the bolt threads, then the zero strain reference axis would have to be defined with reference to a predetermined point on the bolt. By defining all of the variable lead characteristics of the connection in the nut threads, the connection is fully effective regardless of the precise position of the nut along the bolt.

A tapered, non-shouldered variable lead threaded connection 285 is shown in FIG. 13 for coupling together a first member 286 having a terminal box 287 defining internal threads 288 and a second tubular member 289 having a terminal pin portion 290 defining external threads 291. Tubular members 286 and 289 may be sections of oil well casing, for example, which in use are subject to an axial tensile load F, as represented in FIG. 13. Connection 285 differs from connections 220 and 260, described above, in that both threads 288 and 291 are defined in frustoconical surfaces of the respective members rather than on right circulary cylindrical surfaces.

In connection 285, both box 287 and pin 290 are loaded in tension over the entire portion of their length subtending the engaged length of the threads of the connection. The stress, strain and strain summation curves pertinent to connection 285 are represented generally in FIG. 13. Curves 292 and 293 represent the tension stress distribution curves for the box 287 and the pin 290, respectively, plotted against the effective length of the connection. Curves 294 and 295 depict the strain distribution characteristics for the box and pin, respectively. Curves 292–295 are plotted with reference to point A which corresponds to the end face 296 of pin 290. In FIG. 13, curve 297 is the summation of curves 294 and 295 with curve 295 shifted up by an amount K sufficient to cause the curves to meet at a point of common slope, thereby to more readily identify the point 298 of zero net relative strain (net relative deflection due to strain) in connection 285. In other words, assume that member 286 is fixed relative to absolute coordinates at point A and the tensile load pertinent to the connection is applied to tubular element 289 to the right of connection 285. In such a circumstance, both box 287 and pin 291 will strain to the right relative to pin end face 296, but at differential rates as a function of the location along the length of the connection from pin end face 296. With respect to connection 285, reference axis 299 is not associated with a location of zero stress in either box 287 or pin 290. Rather, it is associated with that point along the length of the connection at which there is no net relative strain or deflection between the box and the pin.

Stated in another way, the amplitude of curve 294 at its right end represents the distance which box end face 300 moves to the right away from pin end face 296 when the connection is subjected to axial tensile load F. This is total box deflection amount $\Delta_B$. Similarly, curve 295 has an amplitude at its right end of $\Delta_P$, which represents the total deflection or movement of that location of the pin which is coplanar with box end face 300 away from pin end face 296 when the connection is subjected to tensile load F. The amplitude at the right end of curve 297 is equal to $\Delta_B + \Delta_P + K$. Curve 301 in FIG. 13 is curve 297 redrawn with a straight base 302 as opposed to the curved base 303 involved with curve 297. The amplitude of curve 301 at its left end is K and its amplitude at its right end is $K + \Delta_P - \Delta_B$. Curve 301 therefore provides information descriptive of the amount of variable lead spacing which must be provided in connection 285 proceeding in either direction away from reference axis 299. Stated in another way, curve 301 describes the amount of spacing which is to be provided between the load faces of threads 288 and 291 proceeding along connection 285 in either direction from reference axis 299 when the connection is assembled but not subjected to design tensile load F. In FIG. 13, this load face spacing differential is defined entirely in pin external thread 291. However, as noted above, this spacing could be defined entirely in box internal thread 288 or it could be distributed in any desired proportion between threads 288 and 291. Regardless of how the load face spacing characteristic described by curve 301 is distributed between threads 288 and 291, when the connection is subjected to the design tensile load F, the pin and the box will strain and deflect by an amount adequate to bring all of the load faces into contact with each other under equal loads.

It will be appreciated that because box 287 and pin 290 are not of uniform cross-section throughout their threaded lengths, curves 294 and 295 (the strain curves) will not be second order parabolas, with the result that the summation of these curves, i.e., curves 297 and 301, will also not be second order parabolas. This necessarily means that the curve descriptive of the lead variation as a function of turns encountered along the thread to any given point, i.e., a curve analogous to curve 250 shown in FIG. 7, will not be linear. This means that, assuming that all of the variable lead information contained in curve 301 is to be reflected in pin external thread 291, the rate of change of the feed of the thread finishing cutting tool along the nominally constant pitch external threads of the pin, as a function the turns of tubular element 289 in the pertinent machine tool, will not be constant. Instead, the rate of axial movement of the cutting tool used to finish threads 291 axially along tubular element 289 will be non-linear as a function of turns of the tubular element in the machine tool.

CONCLUSION

It will be apparent from the preceding description that this invention provides significant improvements in threaded connections intended in use to be loaded in a selected direction along the axis of the threads by a load of specified magnitude acting in a predetermined direction. When the connection is so loaded, the threads involved in the connection are uniformly stressed along the length of the connection. This means that the connection can be defined with accuracy to achieve its maximum strength under the predetermined load conditions, and to thereafter behave in response to loads in excess of the design load in the same manner as a threaded connection defined with constant pitch, constant lead threads would behave when initially made up. Because the threaded connection according to this invention achieves maximum strength under design load conditions and still has considerable load carrying capacity when loaded beyond design conditions, the connection can be made very compactly and efficiently. This invention therefore makes possible the provision of other structures and devices incorporating such connections in a more compact and efficient manner than has heretofore been the case.

This invention has been described above with reference to an exemplary embodiment of the invention in its presently preferred environment, namely, a well drilling jar. The steps in the design of the exemplary embodiment have been set forth in some detail in order that it may be clearly understood how to use this invention in applications and circumstances different from that reflected by the preferred embodiment. The specific embodiments of this invention described above are merely illustrative of the many and diverse forms which this invention may take, and of the many and diverse applications which this invention may have throughout industry in general. Accordingly, the foregoing description should not be considered as being limited to the particular embodiments which have been illustrated and described above. Rather, this invention should be regarded as having a scope commensurate with a liberal interpretation of the following claims.

TABLE I
EQUATIONS

IN GENERAL, FOR A CONSTANT SECTION AREA A, AND AXIAL LOCATIONS x:

$$S(x) = F(x)/A \quad\quad F(x) = \omega x$$
$$S(x) = \omega x/A \tag{1}$$

$$\Delta(x) = \int_0^x \delta(x) \quad\quad \delta(x) = \epsilon(x)dx \quad\quad \epsilon(x) = S(x)/E$$

$$= \int_0^x (\omega x/AE)dx \quad\quad \delta(x) = (\omega x/AE)dx \quad\quad \epsilon(x) = \omega x/AE$$

$$= \omega/AE \int_0^x x\,dx$$

$$E = \text{YOUNG'S MODULUS}$$

$$= \omega x^2/2AE \Big|_0^x$$

$$\Delta(x) = \omega x^2/2AE \tag{2}$$

MORE SPECIFICALLY, WITH RESPECT TO FIGS. 5, 6 and 7:

$$\Delta x(x)\text{ pin 212} = 0.000619 x^2 \tag{3}$$

$$\Delta x(x)\text{ box 213} = 0.000479 x^2 \tag{4}$$

$$\Delta x(x)\text{ connection 220} = 0.001098 x^2 \tag{5}$$

BY DEFINITION: $x = N/P$ & $P = 5$ $$\Delta x(N)\text{ connection 220 (pin 212)} = 0.001098(0.200N)^2 \tag{6}$$

$x = N/5 = 0.200N$ $$\Delta x(N)\text{ connection 220 (pin 212)} = (4.392 \times 10^{-5})(N^2) \tag{7}$$

$$L_1(N) = \frac{dx_1}{dN} = 0.200 + (8.784 \times 10^{-5})N \tag{8}$$

where $x_1 = N/P + \Delta x(N) = 0.200N + (4.392 \times 10^{-5})(N^2)$ $$L_2(N) = \frac{dx_2}{dN} = 0.200 - (8.784 \times 10^{-5})N \tag{9}$$

where $x_2 = N/P - \Delta x(N) = 0.200N - (4.392 \times 10^{-5})(N^2)$ $$L(N)_{x_o} = [0.200 + (8.784 \times 10^{-5})(1.475)(5)] - (8.784 \times 10^{-5})N \tag{10}$$
$$= 0.20065 - (8.784 \times 10^{-5})N$$

What is claimed is:

1. A threaded connection for connecting first and second members and subject after assembly to a load of specified magnitude applied in a selected direction along the axis of the threads, and in which the threads as so loaded are uniformly stressed, the threads being of constant pitch throughout their lengths along the members with each thread having a load face which is loaded when said load is applied in said direction to the connection, and characterized in that the load faces of the threads on at least one of the members is defined to have a lead which varies from a constant lead by an amount which, at any given location along the threads, is equal to the amount of net relative deflection due to strain of the members along the axis at such location in response to the application to the connection of the load of specified magnitude in the selected direction.

2. A connection according to claim 1 wherein there is associated with the threads having variable lead load faces a point therealong at which the lead of said faces is equal to the lead associated with the constant pitch of the threads.

3. A connection according to claim 2 wherein said point is established at the location along the connection at which there is no net relative strain of the members along the axis when said load is applied in said direction to the connection.

4. A connection according to claim 2 wherein said point is located at one end of the engaged length of the threads of the connection.

5. A connection according to claim 4 wherein the connection is an unshouldered connection.

6. A connection according to claim 4 wherein the connection is a shouldered connection.

7. A connection according to claim 2 wherein said point is located intermediate the engaged length of the threads of the connection.

8. A connection according to claim 7 wherein the connection is an unshouldered connection.

9. A connection according to claim 7 wherein the connection is a shouldered connection.

10. A connection according to claim 1 wherein the lead variation is defined in the load face of the threads of only one of the members.

11. A connection according to claim 10 wherein the one member is externally threaded.

12. A connection according to claim 10 wherein the one member is internally threaded.

13. A connection according to claim 1 wherein the lead variation is defined in the load faces of the threads of both of the first and second members.

14. A connection according to claim 1 wherein the first and second members are components of a well drilling jar.

15. A connection according to claim 14 wherein the jar is arranged to create an impact load between two components thereof in response to static axial loading to a selected level of one of the components, and wherein the connection is disposed in the jar to receive the impact load substantially directly, the impact load comprising said load of selected magnitude.

16. A connection according to claim 15 wherein the jar defines an anvil face and a hammer face movable relative to the anvil face along a line parallel to the axis of the connection; the impact load being created between the anvil and hammer faces, and wherein the connection first member is disposed to receive the impact load essentially directly from the hammer face.

17. A connection according to claim 1 wherein the first member is internally threaded and defines an end face proximate the threaded portion thereof, the second member is externally threaded over a portion thereof which has an axial extent greater than the axial extent of the threaded portion of the first member, and including an internally threaded nut member threaded onto the second member and abutted against the first member end face.

18. A connection according to claim 17 wherein the variable lead is defined only in the load faces of the second member external threads.

19. A connection according to claim 1 wherein the connection threads defined by the first and second members are straight threads.

20. A connection according to claim 1 wherein the connection threads defined by the first and second members are tapered threads.

21. A connection according to claim 1 wherein the rate of change of the lead of the thread load faces is constant.

22. A connection according to claim 1 wherein the rate of change of the lead of the thread load faces varies along the axial extent of the connection.

23. A threaded connection for connecting first and second members and subject after assembly to a load of specified magnitude applied in a selected direction along the axis of the threads, and in which the threads as so loaded are uniformly stressed, the threads being of constant pitch throughout their lengths along the members with each thread having a load face which is loaded when said load is applied in said direction to the connection, and characterized in that the thread load faces have associated therewith a reference point common to both load faces at which relative axial deflection due to strain in the members is zero when the members are threaded together under a selected preload condition, if any, and when the members are subject to the application of the load of specified magnitude, the faces of the threads on at least one of the members being defined in the unstressed condition with a lead which varies from a constant lead, proceeding away from the reference point along the threads, by an amount which, at any location along the threads, is equal to the amount of net relative axial deflection due to strain of the members relative to the reference point in response to loading of the members by the preload condition, if any, and the load of specified magnitude.

24. A connection according to claim 23 wherein the connection is subject to a preload condition and the reference point is defined intermediate the length of the threads.

25. A connection according to claim 24 wherein the location of the reference point intermediate the length of the threads is defined at the place where net relative axial deflection due to strain of the members disappears proceeding along the connection away from the location of maximum effect of the preload condition.

26. A connection according to claim 23 wherein the reference point is located at one end of the engaged length of the threads of the connection.

27. A connection according to claim 23 wherein the lead variation is defined in the load face of the threads of only one of the members.

28. A connection according to claim 27 wherein the one member is externally threaded.

29. A connection according to claim 27 wherein the one member is internally threaded.

30. A connection according to claim 23 wherein the lead variation is defined in the load faces of the threads of both the first and second members.

31. A connection according to claim 30 wherein the proportion of the lead variation defined in the load faces of the first member threads to the total lead variation is constant along the axial extent of the first member threads.

32. An improved thread configuration having high axial strength and relatively low profile useful in connections subject to high axial load in one direction along an axis of the thread, the thread being generally in the form of an American buttress thread having a 7° load face and a 45° following face, and characterized in that the thread profile differs from an American buttress thread by having a width parallel to the thread axis at the end of the engaged height of the thread lying adjacent the root of the thread profile which is essentially equal to two times the engaged height of the thread.

33. A threaded connection using internal and external threads according to claim 32 in first and second members, respectively, in which the threads are basically of constant pitch except in that the load faces of at least one of the threads are defined to have a lead which varies over at least a portion of the axial extent thereof from the constant lead associated with said constant pitch.

34. A method for forming a threaded connection between first and second members subject after assembly of the connection to loading in a selected direction along the axis of the connection threads in such manner that when the connection is so loaded the load faces of the threads are fully engaged and the threads are substantially uniformly stressed, the method including the steps of (a) ascertaining all loads which will be applied to each of the members when the connection is assembled and which will produce axial strain of each member in the portion of the length thereof which will define engaged threads in the assembled and fully loaded connection, (b) determining the amount of net relative axial deflection due to strain between the members at each point along said length of the connection, (c) forming in a portion of the length of at least one of the members threads having a desired profile and straight pitch line, and engageable with mating threads in the other member, such that when the members are threaded together by means of the mating threads, and the members are in an unstressed condition, the load faces of the mating threads at each point along the engaged length of the threads are spaced along the axis by the amount of net relative axial deflection due to strain determined therefor according to step (b).

35. The method according to claim 34 wherein the amount of net relative axial deflection due to strain is determined by (a) determining the distribution of the axial strain in each member over said length thereof when the relevant ones of said all loads are applied to the member, and (b) summing the results of the determinations made according to step (a), thereby to provide a curve or equivalent of the distribution of net relative axial deflection due to strain of the members along said length.

36. The method according to claim 34 wherein the step of forming the mating threads in each member includes the further steps of (a) machining in each member over the relevant length thereof essentially fully finished constant pitch, constant lead threads having said desired profile and pitch, (b) assigning to one or the other or both of the threads the proportion of said load face spacing which is to be associated directly therewith, and (c) machining the load face of each thread to which any portion of said spacing has been assigned sufficiently to cause the thread load faces to be spaced as aforesaid when the connection is assembled and in an unstressed condition.

37. The method according to claim 36 wherein machining of the thread load faces is performed by use of a numerically controlled machine tool.

38. The method according to claim 35 including the further steps of (a) establishing with respect to the threads of at least one of the members a reference point at which there is no net relative axial deflection due to strain between the members, and (b) defining in terms of turns along said thread from the reference point the spacing of each increment of length of the load face thereof from a theoretical constant lead load face corresponding to threads of said desired profile and pitch.

* * * * *